Dec. 19, 1967    E. C. SARLLS, JR    3,359,016
PRESSURE BALANCED FLEXIBLE JOINT
Filed Oct. 11, 1965    2 Sheets-Sheet 1

EDWARD C. SARLLS, JR.
INVENTOR

BY *Robert M. Sperry*

ATTORNEY

United States Patent Office 3,359,016
Patented Dec. 19, 1967

3,359,016
PRESSURE BALANCED FLEXIBLE JOINT
Edward C. Sarlls, Jr., Grand Prairie, Tex., assignor to LTV Aerospace Corporation, Dallas, Tex.
Filed Oct. 11, 1965, Ser. No. 494,711
1 Claim. (Cl. 285—228)

ABSTRACT OF THE DISCLOSURE

This invention relates to a bellows-type flexible joint for connecting angularly abutting ducts wherein a pair of bellows each have one end thereof connected to a respective one of the ducts and have the free end thereof connected to a tension tube, and means are provided for extenally pressurizing the bellows.

---

This invention relates to flexible joints and is particularly directed to pressure balanced, bellows-type flexible joints.

In any ducting system for the transportation of pressurized fluid, it is necessary to provide flexible elements to accommodate relative movement between adjoining duct sections, such as may result from thermal expansion, pressure surges, or the like. Numerous attempts have been made, heretofore, to employ bellows-type flexible joints. However, none of the prior art devices have been entirely satisfactory. Many of the prior art bellows-type flexible joints have been heavy, bulky, complex or expensive. Moreover, many previous bellows-type flexible joints have had relatively high spring rates, which are undesirable for many purposes. Furthermore, many of the prior art devices have employed internally pressurized bellows. However, internally pressurized bellows are in compression when their ends are restrained and therefore, must be relatively stiff to prevent column instability, "squirm" or buckling of the bellows. Attempts to avoid this problem generally result in increasing the size, weight or complexity of the joint structure.

These disadvantages of the prior art are overcome with the present invention and a novel bellows-type flexible joint is provided which is light, compact, simple and inexpensive and yet is mechanically rugged and is capable of application to a wide variety of uses.

The advantages of the present invention are preferably attained by providing a bellows-type flexible joint employing a pair of opposed, externally pressurized bellows each having one end thereof connected to a respective duct and having the free end thereof connected together to absorb unbalanced pressure forces. It is found that this arrangement places the bellows in tension, when the ends thereof are restrained, and overcomes the problems of column stability. Moreover, the use of opposed bellows serves to balance any changes in pressure and prevents undesired pressure forces between the adjoining duct sections. In addition, the device of the present invention permits the spring rate to be minimized. By connecting the bellows together, pressure loads may be absorbed.

Accordingly, it is an object of the present invention to provide an improved flexible joint.

Another object of the present invention is to provide an improved flexible joint which is light, compact, rugged and simple in construction.

A further object of the present invention is to provide a bellows-type flexible joint having the bellows in tension when the ends thereof are restrained, and the bellows are subjected to a positive external pressure.

A specific object of the present inventoin is to provide an improved flexible joint having a pair of opposed, externally pressurized bellows which are connected together to absorb pressure loads.

These and other objects and features of the present invention will be apparent from the following detailed description taken with reference to the figures of the accompanying drawing.

Figure 1:
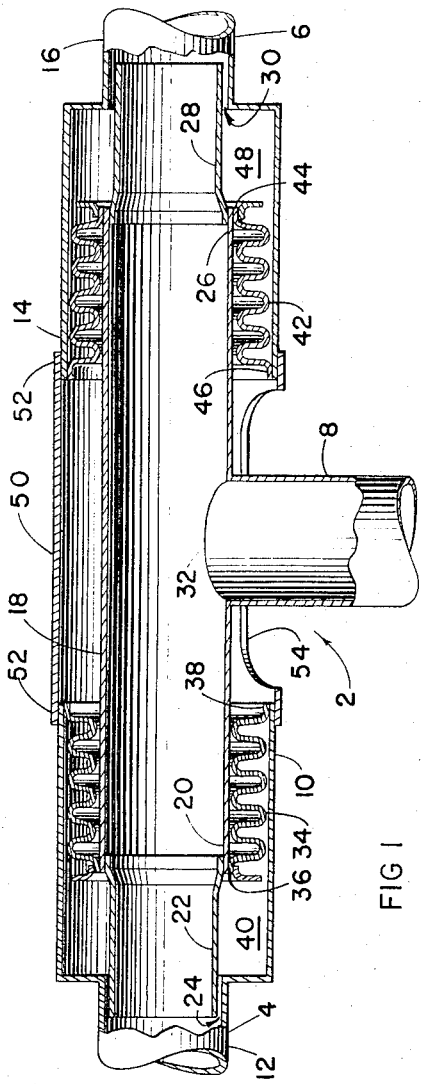
FIGURE 1 is a vertical section through a flexible joint embodying the present invention.

In the form of the present invention chosen for purposes of illustration in FIG. 1, a flexible joint, indicated generally at 2, is shown coupling adjoining duct sections 4, 6 and 8. As shown, duct section 4 is provided with a cylindrical terminal portion 10 of greater diameter than the body 12 of duct section 4. Similarly, duct section 6 is provided with a cylindrical terminal portion 14 of greater diameter than the body 16 of duct section 6. The terminal portions 10 and 14 may be sealed to or formed integral with the respective ducts 4 and 6. A balance tube 18, having a diameter equal to that of the body portions 12 and 16 of duct sections 4 and 6 is provided and extends into the terminal portions 10 and 14 to provide fluid communication between the duct sections 4 and 6. Thus, end 20 of balance tube 18 extends into terminal portion 10 and is provided with an extension 22, of lesser diameter, which projects into the body portion 12 of duct section 4. As seen at 24, an annular space is formed between the exterior of extension 22 and the interior of body portion 12 of duct section 4. Similarly, end 26 of balance tube 18 extends into terminal portion 14 and is provided with an extension 28, of lesser diameter, which projects into the body portion 16 of duct section 6. An annular space 30 is formed between the exterior of extension 28 and the interior of body portion 16 of duct section 6. Duct section 8 is sealed to or formed integral with the balance tube 18, as seen at 32, to form an intersecting joint, such as a T or Y joint.

A first bellows 34 is positioned to overlie the end 20 of balance tube 18 within the terminal portion 10 of duct section 4 and one end 36 of the bellows 34 is sealed to end 20 of balance tube 18 while the other end 38 of bellows 34 is sealed to the rim of terminal portion 10. Thus, a chamber is formed, as indicated at 40, defined by the internal surface of terminal portion 10 and the external surfaces of bellows 34 and extension 22. The chamber 40 has fluid communication with duct section 4 through annular space 24. A second bellows 42 is positioned to overlie the end 26 of balance tube 18 within terminal portion 14 of duct section 6 and one end 44 of bellows 42 is sealed to end 26 of balance tube 18 while the other end 46 of bellows 42 is sealed to the rim of terminal portion 14 to define a chamber 48, similar to chamber 40, which has fluid communication with duct section 6 through annular space 30. Finally, a tension member 50 is attached to or formed integral with the terminal portions 10 and 14, as indicated at 52, and has an opening 54 which permits passage there through of duct section 8 and allows ambient pressure to be applied to the internal surfaces of bellows 34 and 42.

In operation, pressure in the fluid in duct section 4, will be applied through annular space 24 and chamber 40 to the external surface of bellows 34. Since the bellows 34 is externally pressurized, this fluid pressure will tend to cause bellows 34 to contract and, since end 36 of bellows 34 is sealed to end 20 of balance tube 18, contraction of bellows 34 tends to cause movement of balance tube 18 and duct section 8 away from duct section 4. However, the fluid pressure in duct section 4 is also applied through balance tube 18, annular space 30, and chamber 48 to the external surface of bellows 42. This causes bellows 42 to contract and, since end 44 of bellows 42 is sealed to end 26 of balance tube 18, contraction of bellows 42 tends to cause movement of balance tube 18 and duct section 8 toward duct section 4. Thus, bellows 34 and 42 apply opposing forces to balance tube 18, placing balance tube 18 in compression. Furthermore, since end 38 of bellows 34 and end 46 of bellows 42 are sealed to tension member 50 at 52, the expansion of bellows 34 and 42 will place member 50 in tension. This balances the compression load applied to balance tube 18. Consequently, all forces created by the fluid pressure will be absorbed within the flexible joint 2 and will not be applied to ducts 4, 6 or 8.

Figure 2:
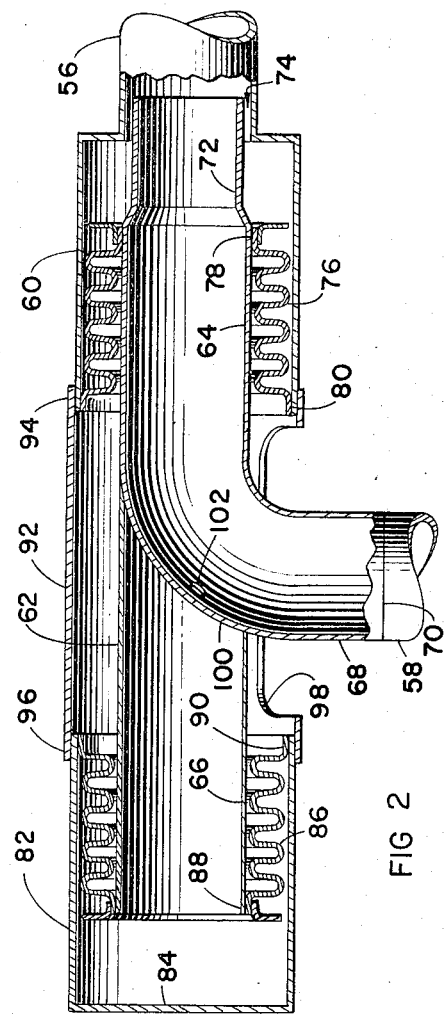
FIGURE 2 is a vertical section through an alternative form of the flexible joint of FIG. 1.

FIG. 2 illustrates an alternative form of the invention for use with flexible joints wherein the adjoining duct sections 56 and 58 form an angle or "elbow." As shown, duct section 56 is identical to duct section 4, of FIG. 1, and is provided with an enlarged terminal portion 60. A balance tube 62 is provided having axially aligned portions 64 and 66 and angularly projecting portion 68 which is sealed to or formed integral with duct section 58, as indicated at 70. Portions 64, 66 and 68 of the balance tube 62 are substantially the same diameter as duct sections 56 and 58 and portion 64 is provided with an extension 72 of lesser diameter which projects into duct section 56 and forms an annular space 74 between the exterior of extension 72 and the interior of duct section 56. A bellows 76 overlies portion 64 of balance tube 62 within terminal portion 60 and one end 78 of bellows 76 is sealed to the end of portion 64 of balance tube 62, while the other end 80 of bellows 76 is sealed to the rim of terminal portion 60. A cylindrical cup 82 covers portion 66 of balance tube 62 and is dimensioned similarly to terminal portion 60 of duct 56. However, cup 82 has a closed end 84. A second bellows 86 overlies portion 66 of balance tube 62 within cup 82 and one end 88 of bellows 86 is sealed to the end of portion 66 while the other end 90 of bellows 86 is sealed to the rim of cup 82. A tension member 82 is sealed to terminal portion 60, as seen at 94, and to cup 82, as seen at 96, and has an opening 98 formed therein to permit passage therethrough of portion 68 of balance tube 62 and to provide ambient pressure to the internal surfaces of bellows 76 and 86. To facilitate fluid flow between duct sections 56 and 58, balance tube 62 is formed with an internal guide member 100 having a port 102 formed therein to permit passage of fluid into portion 66 and cup 82 for applying fluid pressure to the external surfaces of bellows 86.

The operation of this form of the invention is substantially the same as described above, with respect to FIG. 1, as will be readily apparent.

Figure 3:
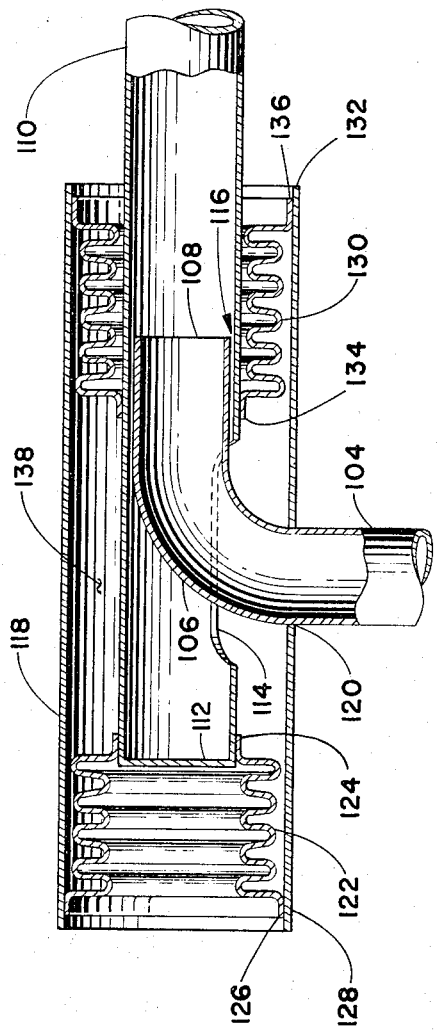
FIGURE 3 is a vertical section through a further alternative form of the flexible joint of FIG. 1.

FIG. 3 illustrates a further alternative form of the invention. In this form of the invention, duct section 104 has an elbow 106 formed adjacent end 108 thereof and end 108 is open. Duct section 110 has a closed end 112 and is formed with an opening 114 in one side thereof. As shown, duct section 104 is of slightly smaller diameter than duct section 110 and elbow 106 of duct section 104 projects through opening 114 of duct section 110 causing end 108 of duct 104 to be telescoped within duct section 110 and forming an annular space 116 between the exterior of end 108 of duct section 104 and the interior of duct section 110. A balance tube 118, having a diameter larger than duct section 110 is fitted over the end 112 of duct section 110 and is sealed to duct section 104, as indicated at 120. A first bellows 122 projects beyond the end 112 of duct section 110 and one end 124 of bellows 122 is sealed to end 112 of duct section 110 while the other end 126 of bellows 122 is sealed to end 128 of balance tube 118. A second bellows 130 overlies duct section 110 within end 132 of balance tube 118 and one end 134 of bellows 130 is sealed to the exterior of duct section 110 while the other end 136 of bellows 130 is sealed to end 132 of balance tube 118.

In operation, pressure appearing in duct 110 will be applied through annular space 116 and opening 114 to chamber 138, defined by the external surface of duct section 110 between points 124 and 134, the external surfaces of bellows 122 and 130, and the internal surface of balance tube 118. Obviously, the internal surfaces of bellows 122 and 130 will be at ambient pressure. It will be seen that the forces applied to balance tube 118 by bellows 122 and 130 will be equal and opposite and, consequently, will result in no relative movement between duct sections 104 and 110 due to pressure.

Obviously, numerous other variations and modifications may be made without departing from the present invention. Accordingly, it should be clearly understood that the forms of the present invention described above and shown in the figures of the accompanying drawing are illustrative only and are not intended to limit the scope of the invention.

What is claimed is:

A flexible joint comprising:

first and second duct sections of given diameter for transporting pressurized fluid mounted with the ends of said duct section adjacent each other;

a cylindrical terminal portion provided on the end of said first duct section and having a diameter greater than said given diameter;

a balance tube having first and second aligned portions and a tubular offset portion, said first aligned portion extending into said terminal portion and said offset portion connecting with the end of said second duct section;

a cup member having one open end and formed with dimensions similar to those of said terminal portion overlying said second aligned portion;

a first bellows connecting said first aligned portion with the free end of said terminal portion;

a second bellows connecting said second aligned portion with the open end of said cup member;

a tension tube connecting said open end of said cup member with the free end of said terminal portion and having an opening therein with the ambient pressure to the internal surfaces of both of said bellows;

said offset portion of said balance tube forming an angle with the longitudinal axis of said tension tube and extending freely through said opening; and means for applying fluid from said duct sections to the external surfaces of said first and second bellows.

References Cited

UNITED STATES PATENTS

| | | | |
|---|---|---|---|
| 2,547,746 | 4/1951 | Cook | 285—227 X |
| 3,038,553 | 6/1962 | Peters | 285—228 X |
| 3,198,558 | 8/1965 | Braden | 285—228 X |

FOREIGN PATENTS 534,704  10/1931  Germany.

CARL W. TOMLIN, *Primary Examiner.*

THOMAS F. CALLAGHAN, *Examiner.*